United States Patent [19]

Thomae

[11] 4,372,692

[45] * Feb. 8, 1983

[54] ELECTRONIC DEVICE TO RECORD TEMPERATURES AND THE TIME OF OCCURRENCE

[75] Inventor: Irving H. Thomae, Norwich, Vt.

[73] Assignee: Trustees of Dartmouth College, Hanover, N.H.

[ * ] Notice: The portion of the term of this patent subsequent to Sep. 1, 1998, has been disclaimed.

[21] Appl. No.: 270,618

[22] Filed: Jun. 4, 1981

Related U.S. Application Data

[63] Continuation of Ser. No. 75,953, Sep. 17, 1979, Pat. No. 4,286,465.

[51] Int. Cl.³ .............................................. G01K 7/00
[52] U.S. Cl. .................................... 374/104; 364/557

[58] Field of Search ............... 73/342, 343.5, 362 AR, 73/DIG. 7, 339 R, 193 A; 364/557

[56] References Cited

U.S. PATENT DOCUMENTS 4,286,465 9/1981 Thomae ............................. 73/342

Primary Examiner—Donald O. Woodiel
Attorney, Agent, or Firm—Robert Shaw

[57] ABSTRACT

A digital min-max thermometer that periodically records temperature and the corresponding time of that temperature and rates minimum and maximum values of temperature for a predetermined time interval (e.g., a 24-hour period). The minimum and maximum values can then be displayed on demand. The apparatus disclosed includes, as well, degree-day information and frost alarm capabilities.

8 Claims, 6 Drawing Figures

ELECTRONIC DEVICE TO RECORD TEMPERATURES AND THE TIME OF OCCURRENCE

This is a continuation application of Ser. No. 06/075,953, filed Sept. 17, 1979, now U.S. Pat. No. 4,286,465.

This invention relates to digitized temperature recorders, and, more particularly to a system and method whereby temperature extremes and their times of occurrence can be detected and displayed.

Home owners concerned with maintaining comfortable temperatures in their living quarters while minimizing the use of expensive energy, gardeners who must protect plants from frost or from drought, motorists whose automobile engines are adversely affected by extreme cold, and others, can take more effective action if they know how ambient temperatures are varying with time. A complete record of such information, such as might be furnished by a temperature sensor(s) connected to a chart recorder, provides more detailed information at greater cost than most such individuals can justify. A concise and accurate report of the minimum and maximum temperatures attained in a given environment over a time interval such as the past twenty-four hours, together with the times at which those extremes occurred, is sufficient for many such purposes and can be provided at significantly lower cost. Hobbyists (e.g., tropical fish fanciers, pottery makers, and the like) also require such information. In the discussion hereinafter, the thrust of the explanation is with reference to min-max thermometers to measure and store indoor/outdoor temperatures that a home owner might desire. However, the thermometer disclosed may be employed, as well, to record min-max temperatures in solar heating apparatus and/or min-max temperatures in the space heated, for example in one or more rooms.

The primary thrust of this invention and the one to which most of this specification is directed is that of providing a thermometer which will report to the user minimum and maximum temperatures over the most recent time period (on the order of twenty-four hours) together with their times of occurrence. The thermometer herein disclosed is intended for a wide consumer market; hence costs are of basic and primary importance. The most straightforward digital method of reporting minimum and maximum temperatures involves maintaining a continuous record, for example minute-by-minute, of temperatures in an extensive storage means such as a large shift register. The entire record can then be scanned, using comparison means and temporary storage means, to identify the extrema. The time of occurrence of an extreme could be determined from its sequential position in the shift register when found. However, the shift register employed would have to possess some 1440 storage locations, each of the desired precision. Such an approach fails to accomplish the objective of low cost.

A second approach, one suggested by others, employs time keeping means and a storage register for each of the two extremes and its time of occurrence. At an arbitrarily chosen but fixed time of each day, such as noon, the minimum and maximum registers are each reset equal to the temperature at that instant of time. Thereafter, at each minute, the present temperature is sensed, digitized, and compared to the stored minimum and maximum. If it is less than the minimum, it is caused to replace that previously found minimum; if greater than the stored maximum, it replaces that. If a replacement action occurred, the present time would be entered in the corresponding storage means. Means can be provided whereby the user may request display of these extrema and times. However, the extrema reported by such a device would pertain only to the time elapsed since its automatic reset had occurred, e.g., if the reset occurs at noon, the "minimum" obtained by request at 7 PM is the minimum of only the most recent seven hours; whereas a true minimum for the past twenty-four hours may have occurred at 5 AM, that information will have been discarded at noon. The minimal-storage system therefore cannot report a full day's history.

Much older min-max thermometers not employing digital or electronic means have employed mercury columns or bimetallic elements which push on mechanical movable markers. A higher temperature than previously attained moves the maximum marker to a new position, and a similar principle applies to the minimum marker. The user must upon occasion re-position the markers; until this is done, the device will record and display the temperature minimum and maximum since the last such action, even though it may have been months ago. The two extremes displayed may not have occurred even within the same week, and no information whatever is retained or displayed concerning their times of occurrence.

The present invention records and reports temperature extremes (and times of occurrence) for a span of recent time whose exact length varies somewhat, e.g., from twenty-one to twenty-four hours, but which may always correctly be said to represent "the past day." It does so with a moderate use of storage means by subdividing the major period (e.g., twenty-four hours) into a set of subintervals (e.g., eight three-hour subintervals). At the start of each subinterval, the oldest pair of extrema in the storage means is discarded. Those locations are reset to the current temperature. For the duration of that subinterval, current temperatures found to be above or below the stored maximum or minimum, respectively, are used to replace them, together with times of occurrence. However, when a subinterval is ended, the data describing it are retained without further alteration until they are (e.g.) twenty-four hours old. When the user requests display of the maximum temperature attained in (e.g.) the past day, comparison means are employed sequentially to find the overall maximum of the set of subintervals, local maximum retained in the storage means, and that maximum and the time associated with it are displayed. The principle is of course similar for minima. A limited supply of storage means thus provides at little cost a faithful report of the temperature extrema, and their times of occurrence, during the major interval ending at the present time.

Accordingly, it is an object of the present invention to provide a novel digitized temperature recorder.

At the beginning and end of a growing season, gardeners must nightly estimate the threat of frost, which may be quite different for points less than a quarter of a mile apart. The present invention provides some warning of frost by extrapolating nighttime outdoor temperatures and providing an alarm indication when that extrapolation passes through the freezing point before warming can be expected after sunrise. On a still night, if weather conditions do not change significantly, this is a reasonably good predictor. Such an extrapolation obviously need not be continued indefinitely, but selecting the appropriate point at which to terminate it can be difficult. The time of sunrise could be computed from date, latitude, and longitude, but temperatures continue to fall after sunrise for a duration which is influenced by climate. In the present invention, however, the time of the preceding morning's minimum is readily available, and that time is used as a most-probable estimate of the equivalent time on the next morning.

A second difficulty, that temperatures do not always decline uniformly at night because of influences including cold fronts, humidity, and changes in cloud cover, is met by repeating the extrapolation procedure periodically throughout the night; if the rate of change of temperature changes, the extrapolation will soon give an altered result. It is an added object of this invention to provide an alarm to the user when an extrapolation of the time course of outdoor temperature indicates that frost is likely before the night is over.

Since, as above indicated, the thermometer disclosed is primarily directed to the high-volume consumer market where selling price is always an issue, another object is to provide a min-max thermometer that can be manufactured in high volume at a relatively low cost and yet provide accurate and substantial data. One embodiment, of prior art, as above noted, requires storing a very large set of successively measured temperature values and reviewing the entire set to identify the temperature extremes. It is an object of this invention to avoid the cost of the large storage means required by such approaches.

Still another object of this invention is to provide the user with information which portrays temperature variations during a major interval of time (such as approximately twenty-four hours) culminating in the present instant, rather than a record which daily begins anew (without reference to past history) at a fixed and arbitrary time such as midnight or noon. It is a further object of the invention to collect and record such information automatically without requiring its user to reset it regularly.

The efficiency of home heating systems cannot be assessed without knowledge of the amount of heating burden imposed by outdoor conditions, usually expressed as "degree days." Yet another object of this invention is to furnish home owners and others with a cumulative total of degree days over a long period of time such as an entire heating season, against which fuel bills may be evaluated.

These and still further objects are addressed hereafter.

The foregoing objects are achieved, generally, in a digital min-max thermometer that comprises, in combination: temperature transducer means for periodically sensing the temperature in the surrounding environment and for providing a signal representative of that temperature; time keeping means to provide the corresponding time of occurrence of the temperature thus sensed; storage means for storing previously attained minimum and maximum values of temperature and the time of occurrence thereof; means for comparing the most recently sensed temperature with stored values of temperature for a limited subinterval of time to find local minimum and maximum temperatures for that subinterval, there being a set of such subintervals that together form a major time interval, minimum and maximum temperatures and corresponding times of occurrence of each said set being stored; means for reviewing the stored minimum and maximum temperatures of each set of subintervals to find the greatest and least temperatures recorded during the most recent major time interval comprising a set of contiguous subintervals terminating at the time of review and the times of occurrence thereof; and means for displaying the most extreme temperatures for said major time interval together with the time of occurrence of each such extreme.

The invention is hereinafter described with reference to the accompanying drawing in which.

Figure 1:
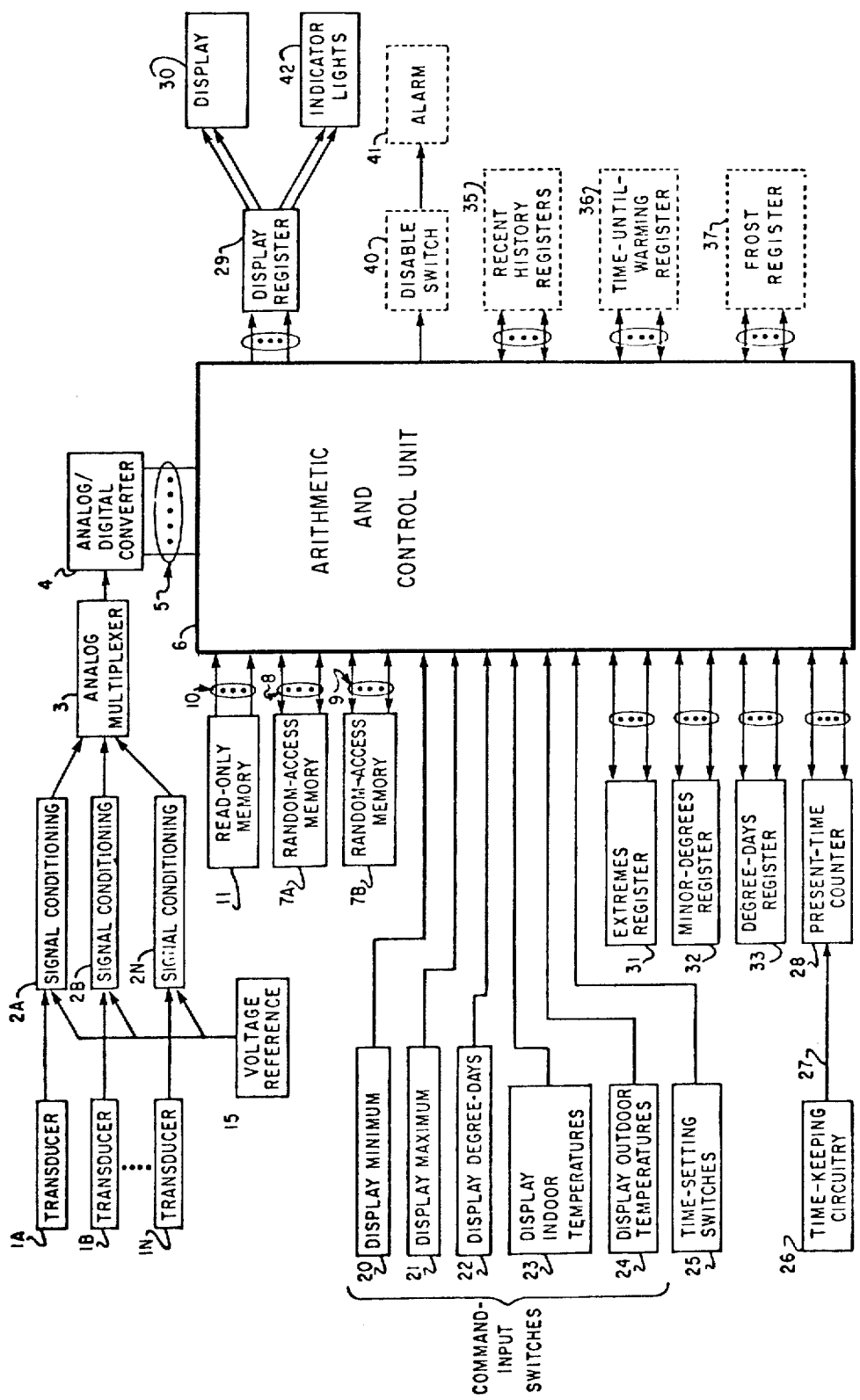
FIG. 1 shows diagrammatically and using mostly discrete circuit elements an embodiment of the invention.

Turning now to FIG. 1, a digital min-max thermometer is shown at 101 comprising a plurality of transducers 1A ... 1N whose respective outputs are conditioned by signal conditioning circuits 2A ... 2N which, together with a voltage reference 15, perform signal conditioning that may include both scaling and offsetting. After appropriate conditioning, the signals are selected by a multiplexer 3 at the direction of an arithmetic and control unit 6 and passed to an analog/digital (A/D) converter 4. The multiple-line output labeled 5 of the A/D converter 4 is connected to the arithmetic and control unit 6. Linear transducers, passing electric current proportional to absolute temperature, such as Ad590J, manufactured by Analog Devices, Inc. of Norwood, Mass., are employed in one embodiment of the invention. (It will be appreciated that thermistors or other non-linear transducers could alternatively be employed, together with linearizing means.) In a preferred embodiment of the invention, an indoor-outdoor thermometer, two transducers are provided. The remainder of this description, then, is limited mostly to a system 101 having two transducers, but the invention is not so limited.

Random access memory (RAM) 7A (or other electronic digital storage means) stores previously observed values of temperature minima and maxima in successive locations, and a RAM 7B stores the time of occurrence associated with each extreme. Messages between the RAMs 7A and 7B and the unit 6 pass along conductors 8 and 9, respectively. A ROM 11 delivers stored instructions to the unit 6 along conductors 10.

Time keeping circuitry 26 supplies a stable time base (which may be derived from the power line frequency or from a crystal oscillator) to provide periodic incrementing pulses on conductor 27 to a counter 28, whereby the present time is kept. At a convenient rate, such as once each minute, the arithmetic and control unit 6 obtains a new temperature reading from the A/D converter 4.

Digital comparison means included within the arithmetic and control unit 6 are employed to compare the new reading with the current minimum, as stored in the RAM 7A. If the new reading is less than that found in the RAM, the new reading is written into the RAM 7A to replace the previous value, and the present time, as found in the present time counter 28, is written at the corresponding location in the RAM 7B; otherwise no change is made in either RAM. The same new temperature reading is then compared to the current maximum, as stored in the RAM 7A, and if it exceeds that maximum, steps similar to those described for the minimum are taken.

Each RAM 7A and 7B contains, for example, eight sets of locations for storage of minima and associated times and eight sets of locations for storage of maxima and associated times, each set being associated with a particular subinterval (e.g., the hours from noon until 3 PM). In this illustrative situation, a major time interval (a twenty-four hour day) is formed of eight, three-hour subintervals each with a maximum and minimum temperature and the time for each. Upon expiration of a subinterval, the arithmetic and control unit 6 alters the addressing for the RAMs 7A and 7B so as to de-select the storage locations which have been the subject of comparison and alteration during the subinterval just ended, and selects those storage locations next in rotation. At this time, the present temperature is written into the locations for both minimum and maximum. Thereafter, comparisons, and alterations as appropriate, continue to be made on these locations until a subinterval of time has again been completed. Thus, at any time there will exist in the RAM 7A records of the minimum and maximum for each of seven complete three-hour periods, for example, together with one set of minimum and maximum for the time span from the beginning of the current subinterval up to the present minute, and the RAM 7B will contain, in corresponding positions, the times of occurrence of these various local extrema.

While the foregoing discussion has assumed the use of RAMs, it will be apparent to a worker skilled in the art that static shift registers or other digital storage means could also be employed, possibly with some modification to the arithmetic and control unit 6. It will also be appreciated that RAMs 7A and 7B need not reside in physically separate parts of the system.

When the user requires a report, for example, of the maximum for the past day (i.e., the major time interval), a display maximum switch 21 is activated. The arithmetic and control unit 6 then sequentially examines the stored local maxima (including that for the current subinterval). The first local maximum in the RAM 7A is loaded into the extremes register labeled 31, and the next local maximum is compared to it by comparison means included within the arithmetic and control unit 6. If the second local maximum exceeds the first, its contents are entered in the extremes register 31. When the process has been applied to all eight of the local maxima, (i.e., to the subintervals), the extremes register 31 will contain the maximum temperature recorded within the past twenty-one to twenty-four hours. This value and the time associated with it at a corresponding location in the RAM 7B are then reported using a display 30, which may be of light-emitting diode, liquid crystal, gas discharge, or other numerical type. In a preferred embodiment of the invention, a single 4-digit display is used to report the two pieces of information sequentially. Separate displays can also be used at greater cost.

The principles of the preceding paragraph will be seen to apply as well, except for the form of the comparison principle, to identifying and displaying the minimum temperature and its time of occurrence (by activating a display minimum switch 20), and to be extensible to a system in which there are more or fewer subintervals than eight.

Separate storage registers 32 and 33, together with adder and subtractor means contained within the arithmetic and control unit 6, are employed in the compilation of degree days. These registers are cleared when power is first applied to the instrument. At intervals of convenient spacing, when a new temperature reading is obtained, it is subtracted from a reference temperature (typically 65° F.). The result is added to the register 32. If the interval chosen is one minute, the contents of the register 32 represent degree minutes. Whenever the contents of the register 32 are found (by the comparison means of the arithmetic and control unit 6) to exceed the equivalent of one degree-day, that quantity is subtracted from the register 32 and the register 33 is incremented by one. At any instant, therefore, the contents of the register 33 represent the total number of degree days observed by the instrument 101 since power was applied to it; a switch 22 effects display of degree days.

When neither degree days nor temperature extremes are being displayed, the present temperature reading obtained from a specified transducer is presented on the display 30 in alternation with the present time. Indoor and outdoor temperature can be displayed at any time by activating switches 23 and 24, respectively.

The frost warning is achieved as follows: at convenient intervals, the time-block storage on hand is scanned, using the arithmetic and control unit 6, for the temperature minimum of the intermediate-length interval from midnight to approximately nine o'clock (AM). The corresponding time of occurrence is read from the RAM 7B, and that time is compared by the arithmetic and control unit 6 to the present time counter 28. Whenever the present time between eight PM and eight AM and the minutes part of the preceding morning's minimum time equals the minutes part of the present time, the present temperature is recorded in one of the recent-history registers 35. On the second and further occurrences of these conditions, an extrapolation is performed, as follows: the number of hours remaining until the end-point is determined (by subtraction in the arithmetic and control unit 6) and held in the time-until-warning register 36, and the present temperature is subtracted from the hour-old reading found in a recent-history register 35, and the result stored in a frost register 37. That difference is the temperature decline for the preceding hour. The arithmetic and control unit then repeatedly subtracts this temperature decline from the present temperature, as held in the frost register 37, while the time-until-warning register 36 is decremented at each iteration. When the contents of the register 36 become zero, a signal therefrom causes the arithmetic and control unit 6 to compare the quantity remaining in the frost register 37 against the freezing-point temperature of thirty-two degrees Fahrenheit. If the projected temperature (as now recorded in the frost register 37) is less than this value, an alarm 41 (which may be a visible or audible warning device) is activated. A switch 40 permits the user to disable the alarm.

Implementation of the present invention can be accomplished by discrete elements, hard-wired in appropriate logical configurations; but the required functions can also be achieved using a microcomputer chip programmed to step through a sequence of instructions that command a particular function.

Figure 2:
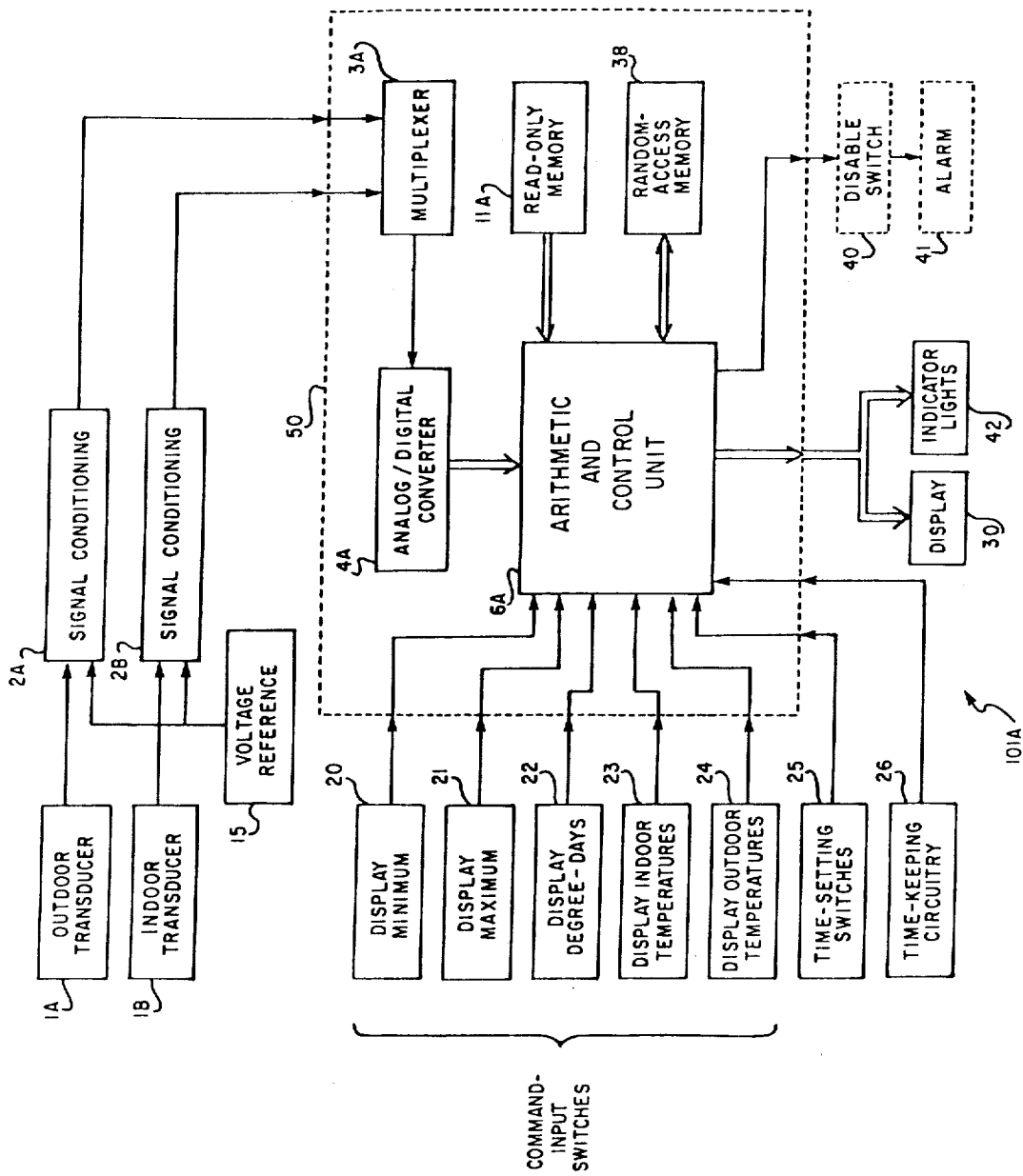
FIG. 2 shows diagrammatically a preferred form of invention, wherein many of the functions of the discrete circuit elements in FIG. 1 are performed by a single microcomputer chip.

Several microcomputer chips are available which incorporate both an arithmetic and control unit, random access memory for data storage, and read-only memory (ROM) to contain a program governing the steps to be executed. A preferred embodiment of the present invention is shown at 101A in FIG. 2 employing a single microcomputer chip 50 containing RAM 38, ROM 11A, a two-input analog multiplexer 3A, and an 8-bit analog-digital converter 4A (the chip 50 used is the 8022 manufactured by Intel Corp. of Santa Clara, Calif.). Functional blocks 3, 4, 6, 7A, 7B, 10, 26, 28, 31, 32, 33, 35, 36 and 37 of FIG. 1 are thus all contained in a single package. Indoor and outdoor temperature transducers 1A and 1B as in FIG. 2 are provided, together with signal conditioners 2A and 2B and function switches 23 and 24 whereby the transducer channel for display may be selected, as well as switches 20, 21, and 22 permitting the user to request recorded information. Additional switches 25 permit setting the correct time of day when the instrument is first powered. Extrema are actually compiled only for the outdoor channel.

It may be seen by comparison with FIG. 1 that most of the functional units thereof are contained within the single microcomputer chip 50 in FIG. 2. The separate RAMs 7A and 7B in FIG. 1 as well as several distinct registers and counters 28, 31, 32, 33, 35, 36 and 37 are implemented as various storage locations within the single RAM 38, comprising sixty four 8-bit bytes. Data are transferred from the switches 20 . . . or the A/D converter 4A at the direction of firmware instructions in the read-only-memory (ROM) 11A; sequences of such instructions thereby replace some of the direct interconnections between blocks shown in FIG. 1.

The signal-conditioning circuits 2A and 2B, together with voltage reference again labeled 15 in FIG. 2, scale and offset the temperature-transducer outputs such that the 8-bit output of the analog/digital converter 4A will be directly equivalent to degrees Fahrenheit (i.e., one least significant bit equals one degree), referenced to a convenient negative temperature such as −55°. An 8-bit storage location is then always sufficient to record any temperatures which could reasonably be expected to be sensed out of doors.

Figure 3:
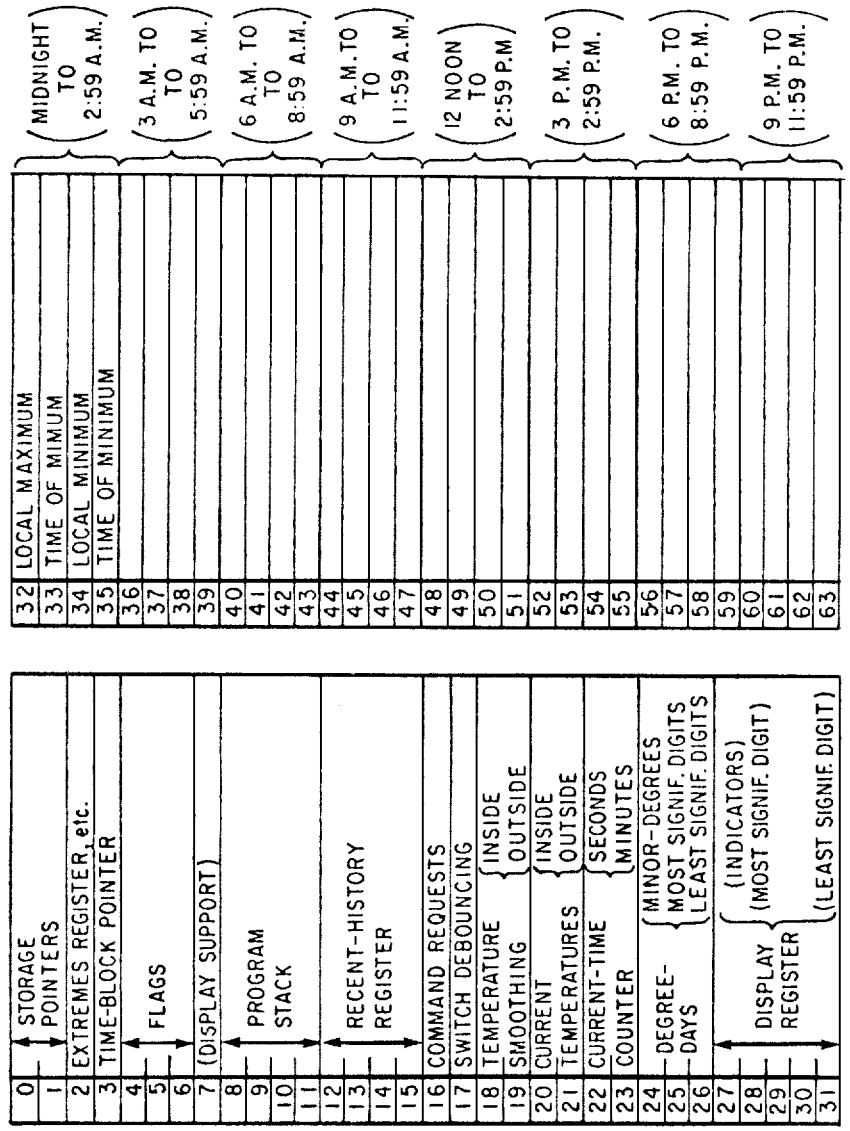
FIG. 3 illustrates the allocation of various storage locations in the random access memory of FIG. 2.
Figure 4A:
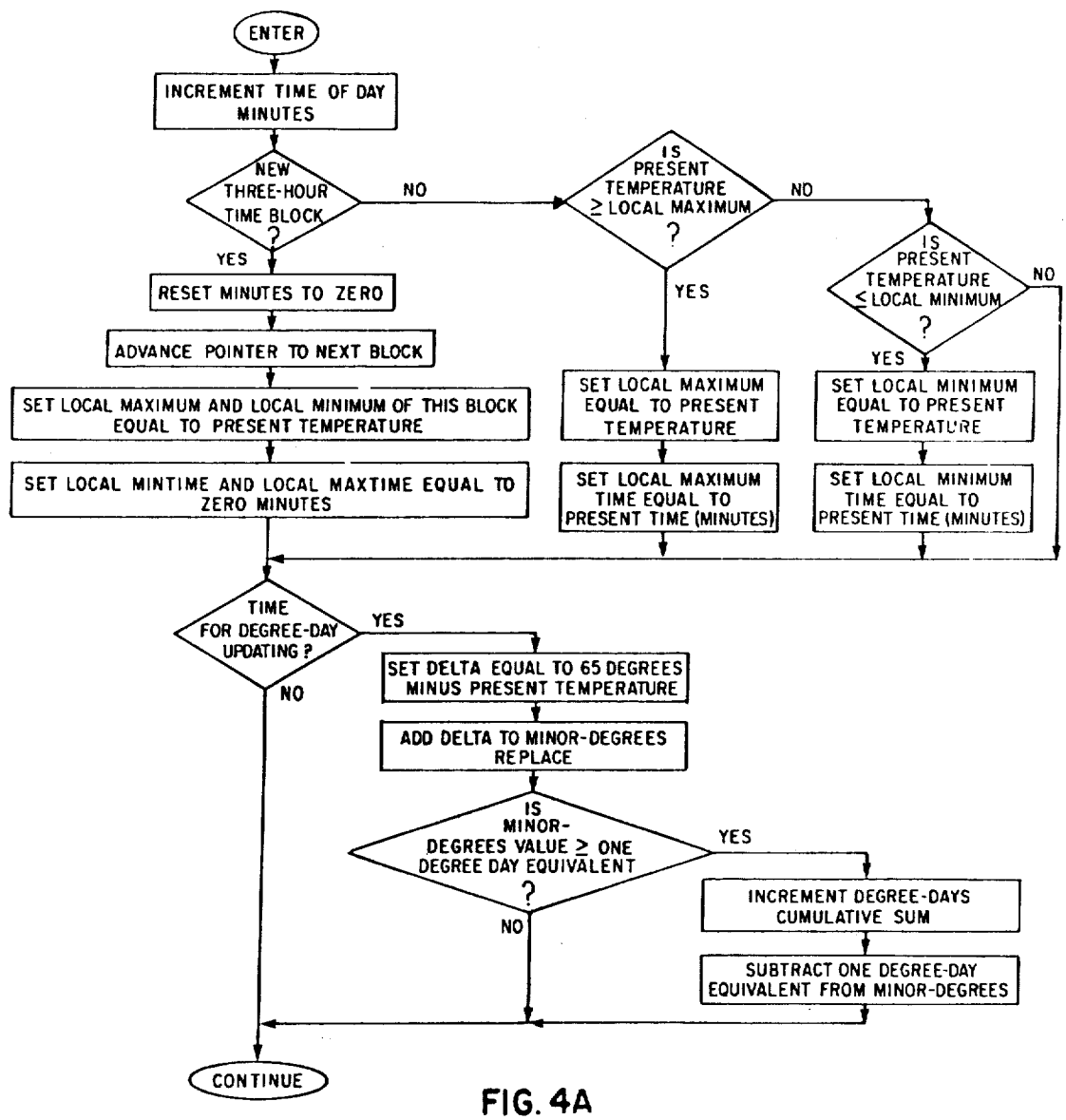
FIGS. 4A 4B and 4C are flow charts detailing operation of the microcomputer of FIG. 2 to perform the various functions hereinafter outlined.
Figure 4C:
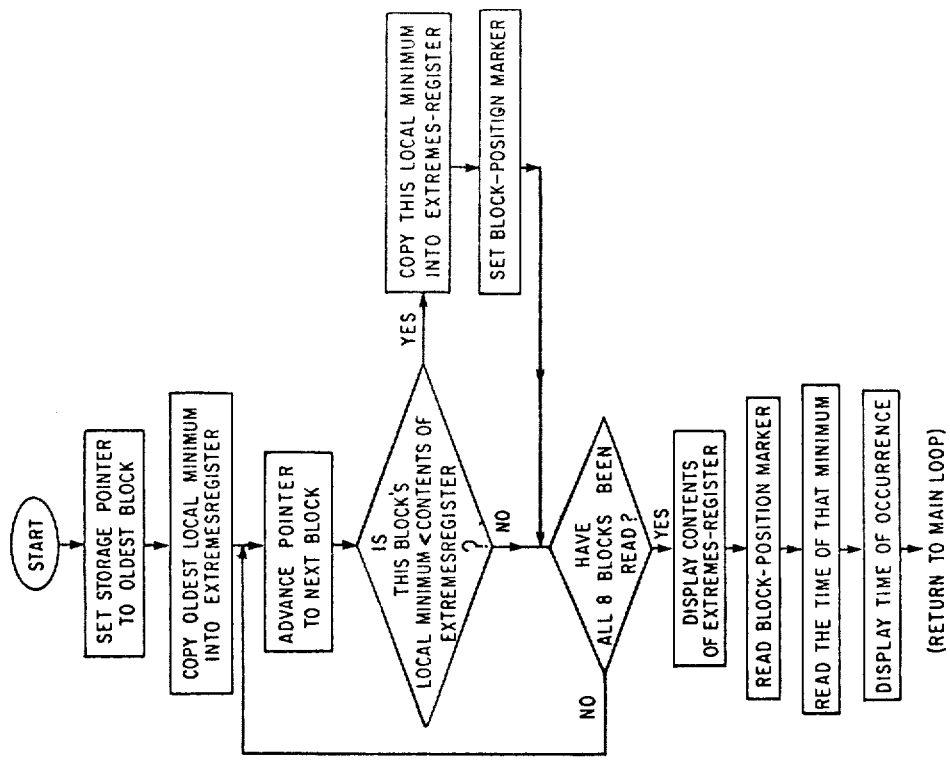
Figure 4B:
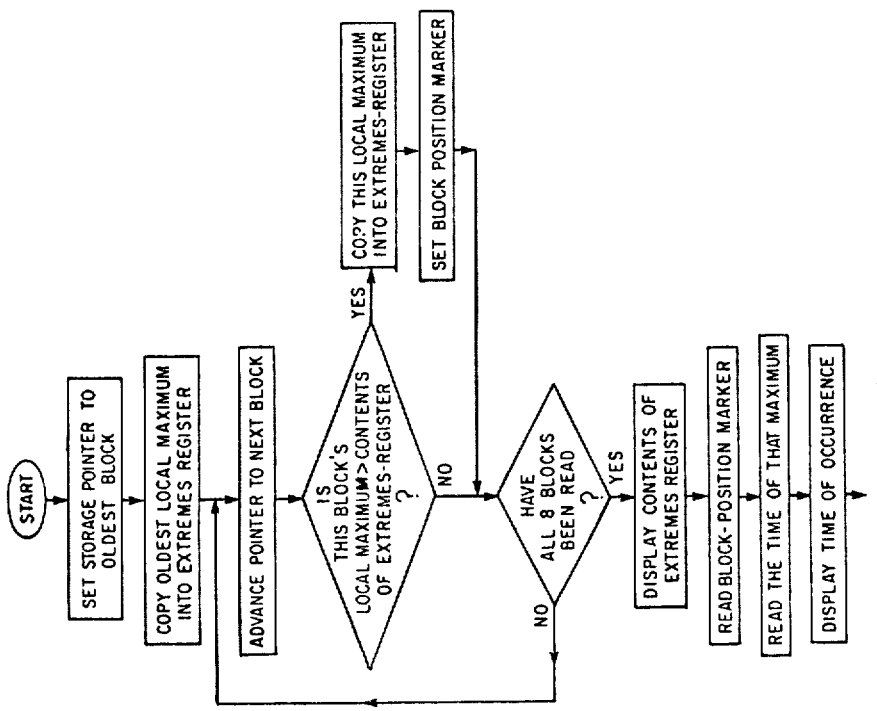

The flow charts in FIGS. 4A, 4B, 4C, detail the manner in which those operations relating to the principal objects of the invention are carried out in the preferred embodiment, and FIG. 3 illustrates the allocation of various storage locations in the RAM 38. The locations at which local extrema are stored (equivalent to the RAM 7A of FIG. 1) and those at which their times of occurrence are stored (equivalent to the RAM 7B of FIG. 1) are in fact interleaved, occupying the entire second half of the RAM 38 of FIG. 2. For each three hour block, four bytes are reserved for local maximum, its time-of-occurrence, local minimum, and its time-of-occurrence; and there are eight such blocks of four bytes each, corresponding to the eight three-hour subintervals which make up the twenty-four hour major interval. In eight bits, time can be recorded to the nearest minute within a three-hour block (one part in 180); the sequential location of the block itself identifies the hour.

The time-keeping circuitry 26 sends a pulse to the arithmetic and control unit marked 6A in FIG. 2 once each second. A "seconds" count is maintained, and when that count reaches sixty it is reset and the current-time minutes count is incremented. As will be seen, that count is reset upon reaching 180, and the present-time hour is implicitly encoded in the position of a pointer. At the beginning of each new minute, the steps illustrated in FIG. 4A are executed. The count of minutes is incremented, and the result is compared with 180, the total number of minutes in a three-hour block. If the minutes count has reached 180, a new time block must be started. In that instance, the minutes count will be reset to zero, and the block pointer will be advanced to the next time block. The present outdoor temperature reading is entered in the "local min" as well as the "local max" locations of this new storage block, and zero (the present time in minutes, dating from the start of this time block) is entered in the time locations. These actions have the effect of discarding (by obliterating them) the local extrema, etc., of that time block which has just become twenty-four hours old.

Upon the next minute (and all succeeding minutes, up to 180) a new outdoor reading will be obtained. It is first compared with the local maximum (as stored in the first location of the current block). If this current reading exceeds the local maximum already on hand, its value is entered in place of that already there, and the present time (in minutes from the start of this block) is entered in the next location. If no substitution has been found necessary, the present temperature is next compared to the local mininum, and if the present temperature is found to be lower than the present local minimum, analogous substitutions are made.

The next steps, which pertain to the accumulation of degree days, are carried out only once for each eight minutes, so that the subtotals accumulated can be contained within a single eight-bit location. Upon each "degree-day minute," the present temperature is subtracted from 65°, and the result is added into the minor-degree location. When a sum of 180 has been attained in this location, that is equivalent to one degree-day. Therefore, the result of said addition is compared to 180. If it exceeds that value, 180 is subtracted from it, and the degree-day location is incremented by one.

As indicated, the events described above occur at regular intervals of one, eight, or 180 minutes. During the time between them, the indoor and outdoor temperatures are read once each second. According to whether the user has last requested display of the indoor or outdoor channel, the appropriate temperature is displayed, alternating with display of the current time. Regardless of which channel is being displayed, however, the steps shown in FIG. 4A continue to be executed (using the outdoor temperature) at the appropriate times.

When the user requests a report of the past day's maximum, the steps illustrated by FIG. 4B are executed. The local maximum from the oldest (three hour) storage block is copied into the extremes register and a pointer is set to the next block following. A comparison is made between the tentative maximum held in the extremes register and the maximum of the next three hour subinterval. If this next local maximum is greater than or equal, a substitution is made and a record of the pointer position is made so that this block can be found later. The pointer is then advanced, and the process is repeated until all eight local maxima have been examined. At the end of the process, the extremes register will hold the largest member of the set of local maxima, which is the overall maximum for the day-long interval ending at the present moment. This result is displayed, followed by the time found associated with it. The analogous steps followed when display of the minimum is requested are shown in FIG. 4C.

The detailed steps involved in detecting command-switch closures, in setting the time-of-day clock after a power failure, and in operation of the display once given a temperature or time for display, are entirely conventional practice of current microprocessor art. It will be obvious to persons skilled in that art how those functions can be implemented by simple sequences of firmware instructions.

In another embodiment of this invention, fewer separate subintervals of time, each of greater length, may be used, and either the falling-temperature alarm or the degree-day computation may be omitted. The RAM locations thus left uncommitted are then employed, following the same procedures, to detect, record, and report the temperature extrema and their times of occurrence for the indoor channel as well as the outdoor channel.

It should be clear from the foregoing that the precise length of the major interval, nominally referred to as a day, varies somewhat according to the time at which an extremum is requested. In the preferred embodiment, it varies from twenty-one to twenty-four hours, because the oldest subinterval began on a clock hour such as 12, 3, 6, etc., but the current subinterval ends at the actual present time. Alternative embodiments of this invention are possible in which smaller subintervals of time than three hours are used, so that the length of the history reported varies between narrower limits. If maximum, minimum, and times of occurrence are all to be kept, however, such embodiments require more RAM than sixty-four eight-bit bytes.

The method of using storage can also be modified. Instead of using eight separate three hour subintervals, compiling local extrema for each, and extracting therefrom the overall extrema upon demand, a like number of overlapping twenty-four hour blocks can be employed, with extrema continuously computed for all within their respective time limits. At the start of each three hour interval, the oldest twenty-four hour extrema are discarded. If times of occurrence are to be retained to the nearest minute, however, the use of twenty-four blocks requires more than one 8-bit bytes of storage for each such time recorded, whereas the method described above needs but one. The overlapping twenty-four hour periods, therefore, also require a total RAM of more than sixty-four 8-bit bytes.

At the present, single microcomputer chips and other large-scale integrated circuits incorporating both RAM and an analog/digital converter are limited to sixty-four bytes of RAM and two input channels. Other embodiments of this invention, such as suggested by FIG. 1, having more than two temperature transducers and compiling extrema separately for each channel, can be constructed. Larger RAMs and analog multiplexers having more input channels are required, and these components cannot yet be purchased combined in a single silicon chip. A number of microcomputer chips are available, incorporating both arithmetic and control means and read-only-memory, to which external RAM of much greater size than 64 bytes can be connected. Multiple-channel embodiments of this invention, such as might be useful for studying the performance of solar heating systems, etc., are therefore entirely feasible at this time, but require substantially more physically separate components. It is to be anticipated, however, that advances in large-scale-integrated-circuit technology will eventually permit the use of a single chip for multiple-channel embodiments of this invention, as well as for the alternative embodiments described above.

Further modifications of the invention herein described will occur to persons skilled in the art and all such modifications are deemed to be within the spirit and scope of the invention as defined by the appended claims.

What is claimed is:

1. A digital min-max thermometer that comprises: temperature transducer means for periodically sensing the temperature in the surrounding environment and for providing a signal representative of that temperature; means to provide the corresponding time of occurrence of the temperature thus sensed storage means for storing previously attained minimum and maximum values of temperature and the times of occurrence of each extreme; means for comparing the most recent sensed temperature with stored values of temperature for an interval of time in order to find the minimum and maximum temperatures, and their times of occurrence, attained during that interval; means for displaying the extreme temperatures for said interval together with the times of occurrence of each such extreme; means to perform periodically an extrapolation of temperature from the present time to the stored time of occurrence of either the maximum or minimum temperature for the preceding interval, in order to estimate the highest or lowest temperature likely to be attained in the present interval.

2. A digital min-max thermometer as claimed in claim 1 that includes means for displaying the predicted minimum or maximum temperature on demand.

3. A digital min-max thermometer as claimed in claim 1 that includes means for comparing a predicted extreme of temperature to some predetermined dangerous value and operable to provide advance warning of the likelihood of attaining said value.

4. A digital min-max thermometer as claimed in claim 3 wherein the time interval is one day, the extrapolated temperature for the time corresponding to the next previous day's minimum is compared to the freezing point of water, and having means operable to provide a warning if said extrapolated temperature is less than the freezing point of water.

5. A digital min-max thermometer as claimed in claim 4, wherein the warning action is accompanied by display of the extrapolated temperature predicted is attained.

6. A digital min-max thermometer as claimed in claim 5, wherein means is provided to display the time of occurrence of said extrapolated temperature.

7. A digital min-max thermometer as claimed in claim 3 that includes means for setting the value of temperature to be employed for comparison, together with indication as to whether said value represents a dangerously high or low temperature, and operable to provide a warning if the extrapolated temperature exceeds or falls below, respectively, said critical value.

8. A digital min-max thermometer as claimed in claim 3, wherein warning action is accompanied by display of the extrapolated temperature, together with the time of occurrence predicted to be attained.

* * * * *